(12) United States Patent
Huffman et al.

(10) Patent No.: US 10,642,378 B2
(45) Date of Patent: May 5, 2020

(54) COLLAPSIBLE ELECTRONIC STYLUS

(71) Applicant: GOOGLE LLC, Mountain View, CA (US)

(72) Inventors: Katherine Huffman, Mountain View, CA (US); Donny Chen Reynolds, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 44 days.

(21) Appl. No.: 15/982,968

(22) Filed: May 17, 2018

(65) Prior Publication Data
US 2019/0354204 A1 Nov. 21, 2019

(51) Int. Cl.
*G06F 3/0354* (2013.01)

(52) U.S. Cl.
CPC ................ *G06F 3/03545* (2013.01)

(58) Field of Classification Search
CPC .................................................. G06F 3/03545
See application file for complete search history.

(56) References Cited

U.S. PATENT DOCUMENTS

| 5,889,512 A | 3/1999 | Moller et al. |
| 5,988,918 A * | 11/1999 | Johnson ............... B43K 5/005 401/88 |
| 9,186,929 B1 * | 11/2015 | Mock ..................... B43M 3/045 |
| 2005/0162412 A1 | 7/2005 | Rönkkö et al. |
| 2014/0071100 A1 | 3/2014 | Becerra Figueroa |
| 2015/0070304 A1 * | 3/2015 | Lettow ................... G06F 3/044 345/174 |
| 2015/0153821 A1 | 6/2015 | Chi et al. |
| 2015/0153851 A1 * | 6/2015 | Knepper ............. G06F 3/03545 345/179 |

FOREIGN PATENT DOCUMENTS

| CN | 202862906 U | 4/2013 |
| WO | 2017160544 A1 | 9/2017 |
| WO | WO2017160544 * | 9/2017 ........... G06F 3/0354 |

OTHER PUBLICATIONS

Killham, "Flexible stylus has some cool hidden talents [Reviews]", Reviews (https://www.cultofmac.com/category/reviews/), Apr. 19, 2016, pages 1-5.
International Search Report and Written Opinion for International Application No. PCT/US2019/026332, dated Jun. 21, 2019, 16 pages.

* cited by examiner

*Primary Examiner* — Andrew Sasinowski
(74) *Attorney, Agent, or Firm* — Brake Hughes Bellermann LLP (57) ABSTRACT

A collapsible electronic stylus can include multiple panels, a processor, and a transmitter. The multiple panels can be rotatably attached to each other, the rotatable attachment of the multiple panels forming a loop and enabling the multiple panels to rotate with respect to each other between an open position that maximizes a volume enclosed by the panels and a collapsed position that minimizes the volume enclosed by the panels. The processor can be attached to at least one of the panels, the processor being configured to control a transmitter. The transmitter can be configured to transmit signals to a computing device.

19 Claims, 9 Drawing Sheets

COLLAPSIBLE ELECTRONIC STYLUS

TECHNICAL FIELD

This description relates to electronic styluses.

BACKGROUND

Electronic styluses can facilitate input into an electronic device, such as a touchscreen of an electronic device. Some styluses that are ergonomically comfortable are too large to be garaged into the electronic device. Some styluses are small enough to be garaged into the electronic device, but are thin and feel unnatural or uncomfortable for the user.

SUMMARY

An electronic stylus described herein can expand into an open position that is large and comfortable to a user, and contract into a collapsed position that is small enough to be garaged into a portable computing device.

According to an example, a collapsible electronic stylus can include multiple panels, a processor, and a transmitter. The multiple panels can be rotatably attached to each other, the rotatable attachment of the multiple panels forming a loop and enabling the multiple panels to rotate with respect to each other between an open position that maximizes a volume enclosed by the panels and a collapsed position that minimizes the volume enclosed by the panels. The processor can be attached to at least one of the panels, the processor being configured to control a transmitter. The transmitter can be configured to transmit signals to a computing device.

According to an example, a collapsible electronic stylus can include a shell portion, a processor, and a transmitter. The shell portion can be configured to respond to pressure by transitioning from a first position in which the shell is biased toward a cylindrical shape to a second position in which the shell is biased toward a flat shape with opposite sides of the shell portion in contact with each other. The processor can be attached to the shell portion, the processor being configured to control a transmitter. The transmitter can be configured to transmit signals to a computing device.

According to an example, a portable computing device can include a display and a base rotatably attached to the display. The base can include at least one device processor controlling the display, a receiver configured to receive wireless signals and transmit the received wireless signals to the at least one device processor, and an electronic stylus disposed in a slot of the base in a collapsed position. The base can define the slot. The electronic stylus can include multiple panels, a stylus processor, and a transmitter. The multiple panels can be rotatably attached to each other, the rotatable attachment of the multiple panels forming a loop and enabling the multiple panels to rotate with respect to each other between an open position that maximizes a volume enclosed by the panels and the collapsed position that minimizes the volume enclosed by the panels. The stylus processor can be attached to at least one of the panels, and can be configured to control the transmitter. The transmitter can be configured to transmit the wireless signals to the portable computing device.

The details of one or more implementations are set forth in the accompanying drawings and the description below. Other features will be apparent from the description and drawings, and from the claims.

DETAILED DESCRIPTION

Figure 1A:
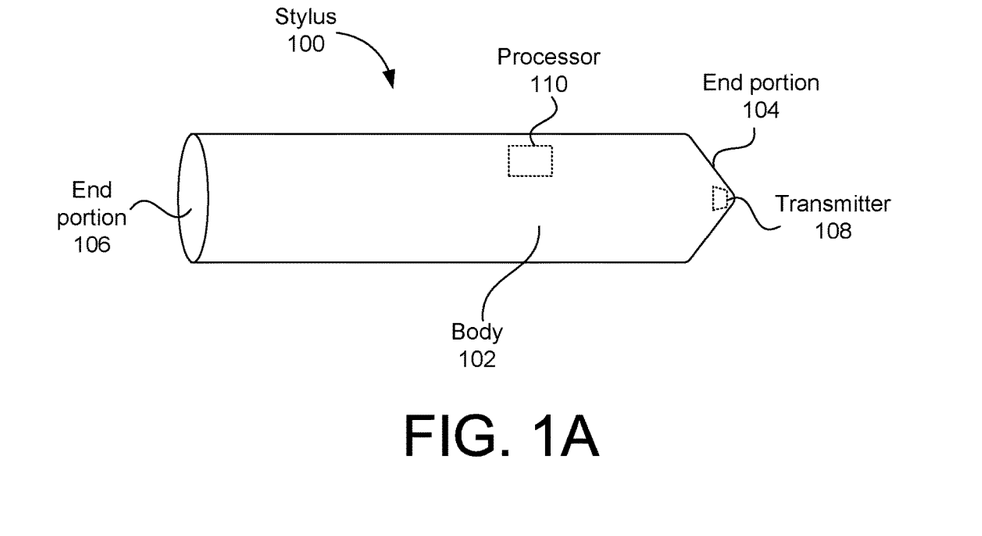
FIG. 1A is a diagram of a stylus in an open position according to an example implementation.

FIG. 1A is a diagram of a stylus 100 in an open position according to an example implementation. The stylus 100 can be an electronic stylus that provides location signals to a portable computing device, enabling a user to provide input to the portable computing device by placing the stylus proximal to a display of the portable computing device as if the user were writing on the display with a pen.

The stylus 100 can include a body 102 having a cylindrical or polygonal shape. The body 102 can also be considered a shell and/or shell portion. The body 102 can expand from a collapsed position into an open position with the cylindrical shape or polygonal shape shown in FIG. 1A in response to pressure such as squeezing pressure or twisting pressure. In the open position, the user can hold the stylus like a pen to provide input into the portable computing device. The body 102 can contract or collapse from the open position into a collapsed position with a flat shape or position shown in FIG. 1B in response to pressure such as squeezing pressure or twisting pressure. In the collapsed position, the user can garage and/or store the stylus 100 in a slot of the portable computing device.

The stylus 100 can include an end portion 104 attached to, and/or integral with, the body 102. The end portion 104 can be conical or pyramid-shaped, and can have either a round or pointed end opposite from the body 102. The end portion 104 can contact the display or other portion of the portable computing device when the user provides input to the portable computing device using the stylus 100.

The end portion 104 can include a transmitter 108, and/or the stylus 100 can include a stylus transmitter 108 attached to the end portion 104. The transmitter 108 can be attached to an interior portion of the end portion 104, so that the transmitter 108 is not visible from outside the stylus 100 and is not likely to be contacted and broken away from the stylus 100.

The transmitter 108 can transmit location signals, which can be wireless signals and/or electromagnetic signals. The location signals can indicate the location of the end portion 104 of the stylus 100. The location signals can be interpreted by the portable computing device as input into the portable computing device, indicating the location of the end portion 104 on the display of the portable computing device. The portable computing device can respond to the location input by, for example, drawing lines or other shapes at the inputted location, selecting options based on icons near the end portion 104 on the display, or moving or changing appearances of icons near the end portion 104 on the display, as non-limiting examples.

The body 102 can include a processor 110, and/or the stylus 100 can include a stylus processor 110 attached to the body 102. The processor 110 can be attached to an interior portion of the body 102, so that the processor 110 is not visible from outside the stylus 100 and is not likely to be contacted and broken away from the stylus 100. The processor 110 can control the transmitter 108. The processor 110 can be wirelessly coupled to the transmitter 108, or can be coupled to the transmitter 108 via wires. Some embodiments can include a capacitive touch processor with no processor and/or transmitter.

The stylus 100 can include an end portion 106 at an opposite end from the end portion 104. The end portion 106 can form a back of the stylus 100, and can seal the stylus to prevent outside objects from entering the stylus 100. The end portion 106 can be rotatably attached to the body 102, and can rotate away from the body 102 when the stylus 100 is in the collapsed position. In some examples, the end portion 106 can include a location transmitter coupled to the processor 110 by a wireless or wired interface, and can provide location input to the portable computing device so that the end portion 106 can be used as, or example, an eraser.

Figure 1B:
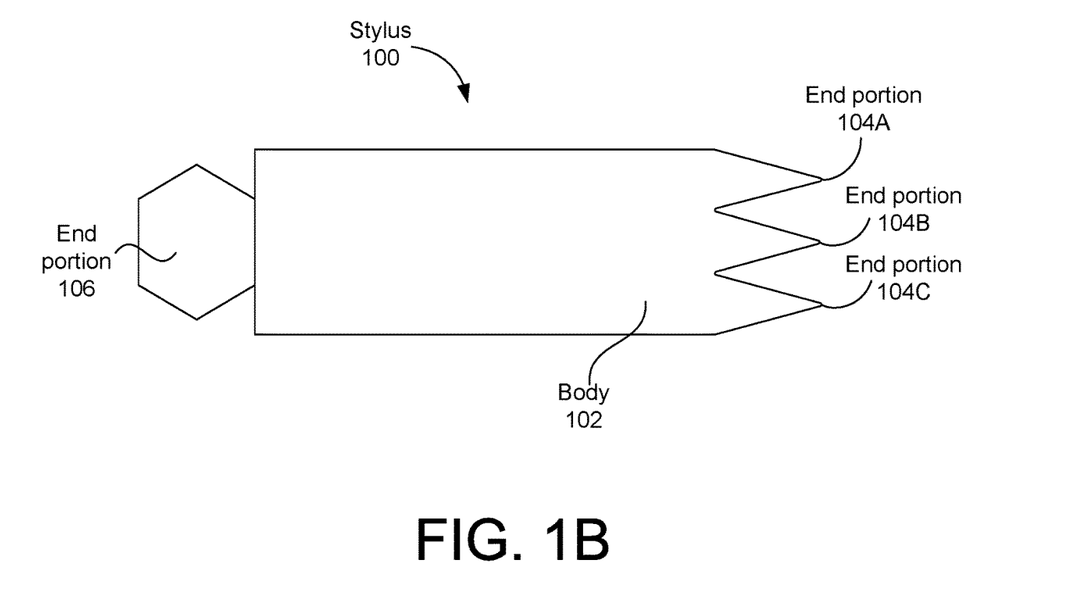
FIG. 1B is a diagram of the stylus in a collapsed position according to an example implementation.

FIG. 1B is a diagram of the stylus 100 in a collapsed position according to an example implementation. In this example, squeezing or twisting pressure has been applied to the stylus 100, causing the stylus 100 to collapse into the collapsed position shown in FIG. 1B. In the collapsed position, opposite ends of the body 102 can be in contact with each other, reducing the thickness but increasing the width of the stylus 100. The end portion 106 is rotated away from the body 102 to minimize the width of the stylus 100.

In some examples, the end portion 104 shown in FIG. 1A comprises multiple end portions 104A, 104B, 104C. While three end portions 104A, 104B, 104C are shown in the example of FIG. 1B, in which example three additional end portions (not shown) would be behind the end portions 104A, 104B, 104C, for a total of six end portions, the end portion 104 can comprise any number of end portions. In the open position shown in FIG. 1A, the end portions 104A, 104B, 104C (and the other end portions that are not shown in FIG. 1B) can attach to each other to form the conical or pyramidal end portion 104 shown in FIG. 1A.

Figure 1C:
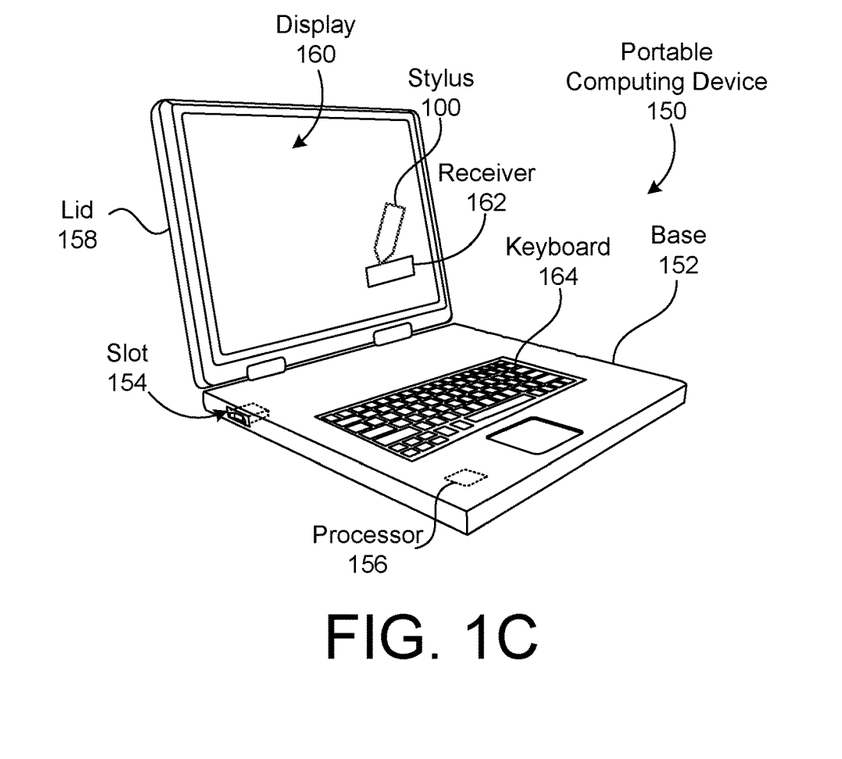
FIG. 1C is a diagram of a portable computing device and the stylus providing input into the portable computing device according to an example implementation.

FIG. 1C is a diagram of a portable computing device 150 and the stylus 100 providing input into the portable computing device 150 according to an example implementation. In the example shown in FIG. 1C, the portable computing device 150 is a laptop computer comprising a lid 158 with a display 160, the lid 158 being rotatably attached to a base 152. The portable computing device 150 could also include, for example, a tablet computer or a smartphone with a slot 154 and a display 160.

The display 160 can include at least one receiver 162 for receiving location input from the transmitter 108 (shown in FIG. 1A). The receiver 162 can receive the location signals from the transmitter 108, enabling the portable computing device 150 to determine the location of the end portion 104 (shown in FIG. 1A) and respond to the location of the end portion 104 by drawing and/or presenting lines or other shapes at the location of the end portion 104, selecting options based on icons near the end portion 104 on the display 160, or moving or changing appearances of icons on the display 160 near the end portion 104, as non-limiting examples.

The base 152 can define a slot 154. An opening of the slot 154 can be rectangular or oval-shaped. The slot 154 can receive the stylus 100 when the stylus 100 is in the collapsed position, enabling a user to store the stylus 100 in the portable computing device 150.

The base 152 of the portable computing device 150 can include a keyboard 164 for receiving input from a user, such as alphanumeric input. The portable computing device 150 can include a device processor 156 enclosed by the base 152. The processor 156 can control the output of the display 160, can process input received by the receiver 162 and/or keyboard 164, and can cause the portable computing device 150 to perform any combination of functions, techniques, and/or methods described herein.

Figure 1D:
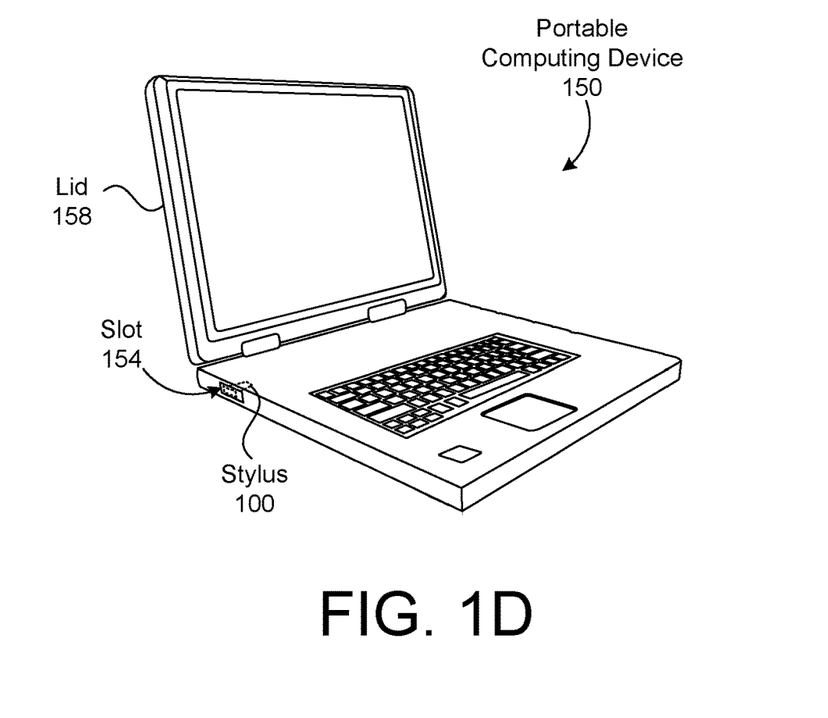
FIG. 1D is a diagram showing the stylus garaged in the portable computing device according to an example implementation.

FIG. 1D is a diagram showing the stylus 100 garaged in the portable computing device 150 according to an example implementation. In this example, the stylus 100 has been collapsed and/or contracted into the collapsed position, and inserted into the slot 154 of the portable computing device 150 for storage.

Figure 2A:
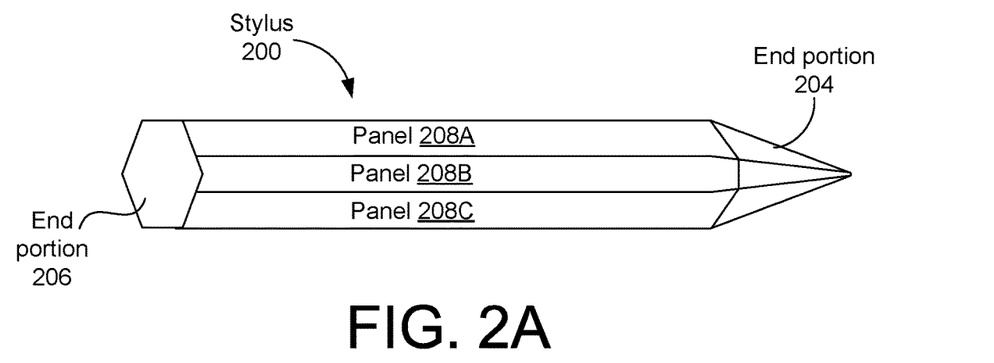
FIG. 2A is a diagram of a stylus with multiple panels in an open position according to an example implementation.

FIG. 2A is a diagram of a stylus 200 with multiple panels 208A, 208B, 208C in an open position according to an example implementation. The stylus 200 may include any of the features and/or functionalities of the stylus 100 described above.

Figure 2B:
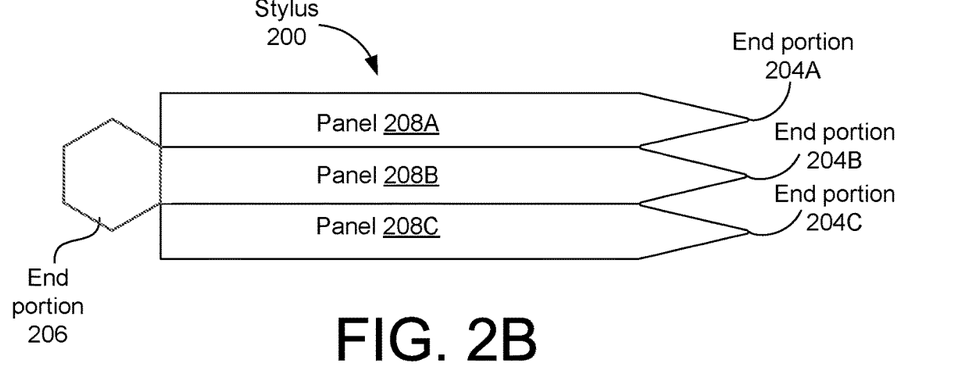
FIG. 2B is a diagram of the stylus with multiple panels in a collapsed position according to an example implementation.
Figure 2C:
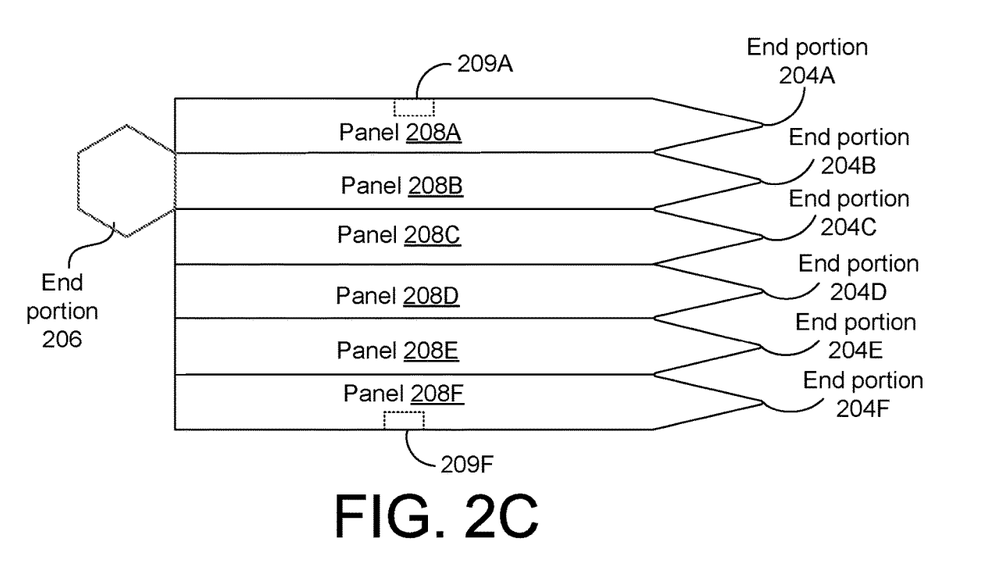
FIG. 2C is a diagram of the stylus with multiple panels in an unrolled position according to an example implementation.

While three panels 208A, 208B, 206C are shown in the example stylus 200 of FIG. 3, with an equal number of panels not visible because they are obscured by the panels 208A, 208B, 208C, this is merely an example. The stylus 200 can include any number of panels 208A, 208B, 208C rotatably attached to each other to form a loop and rotate with respect to each other between an open position that maximizes a volume enclosed by the panels and a collapsed position that minimizes the volume enclosed by the panels 208A, 208B, 208C. The panels 208A, 208B, 208C may maintain and/or form a loop in the open position and/or the collapsed position. In some examples, the stylus 200 can include an even number of panels 208A, 208B, 208C, enabling the panels 208A, 208B, 208C to lay against corresponding panels in the collapsed position, as shown in FIG. 2B. In some examples, the stylus 200 can include an odd number of panels, and the loop formed by the panels 208A, 208B, 208C can be broken and/or opened by the rotatable attachment between at least two of the panels 208A, 208B, 208C disengaging when the stylus 200 is in the collapsed position, as shown in FIG. 2C. The panels 208A, 208B, 208C can be made of a material that is rigid enough to maintain the open shape, but flexible enough to avoid cracking or breaking when pressure is applied to the panels 208A, 208B, 208C when the stylus 200 is in the open position, such as a polymer material including plastic or rubber, carbon fiber, aluminum, rubber, or wood.

FIG. 2B is a diagram of the stylus 200 with multiple panels 208A, 208B, 208C in a collapsed position according to an example implementation. In this example, the panels 208A, 208B, 208C have rotated with respect to each other so that the panels 208A, 208B, 208C visible from the perspective of FIG. 2B are parallel to each other, or nearly parallel to each other such as within five degrees (5°) of each other, and a corresponding number of panels (not visible from the perspective of FIG. 2B) are also parallel to each other and in contact with the panels visible from the perspective of FIG. 2B.

The end portion 206, which may correspond to the end portion 106 shown in FIGS. 1A and 1B, may rotate away from the panel 208B to which the end portion 106 is rotatably attached. In the collapsed position, the end portion 206 can be nearly parallel to, such as within five degrees (5°) of, the panel 208B to which the end portion 206 is rotatably attached.

The panels 208A, 208B, 208C can each include end portions 204A, 204B, 204C at opposite ends from the end portion 206. The end portions 204A, 204B, 204C can be triangular with sharp or rounded ends, and may meet together forming the end portion 204 shown in FIG. 2A in a shape of an imaginary pyramid (with the base missing) when the stylus 200 is in the open position. The panels 208A, 208B, 208C can include a triangular portion corresponding to the end portions 204A, 204B, 204B, and a rectangular portion comprising the remainder of the panel 208A, 208B, 208C not including the end portion 204A, 204B, 204C. The panels 208A, 208B, 208C can be considered side panels, and the end portion 206 can be considered an end panel.

FIG. 2C is a diagram of the stylus 200 with multiple panels 208A, 208B, 208C, 208D, 208E, 208F in an unrolled position according to an example implementation. In this example, the rotatable attachment between panels 208A, 208F has been disengaged, breaking the loop previously formed by the panels 208A, 208B, 208C, 208D, 208E, 208F, and all of the panels 208A, 208B, 208C, 208D, 208E, 208F are parallel to each other in a flat position. The rotatable attachment may have been formed by a connector 209A on an edge portion of the panel 208A engaging a connector 209F on an edge portion of the panel 208F. The connectors 209A, 209B can include magnets, fasteners, a hook and loop, or pins and apertures, as non-limiting examples.

Figure 2D:
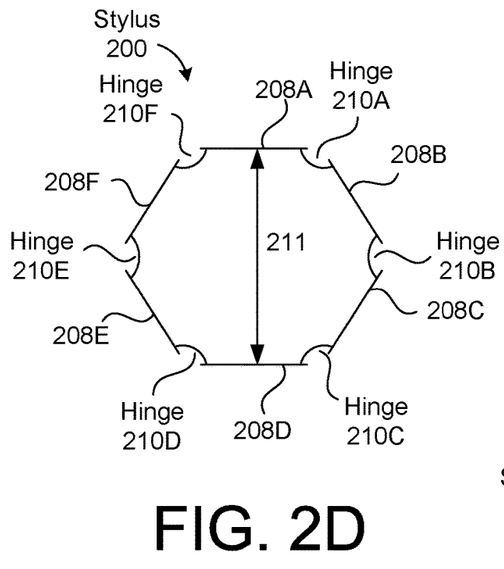
FIG. 2D is an end view of the stylus with multiple panels according to an example implementation.

FIG. 2D is an end view of the stylus 200 with multiple panels 200A, 200B, 200C, 200D, 200E, 200F according to an example implementation. The multiple panels 200A, 200B, 200C, 200D, 200E, 200F can be rotatably attached to each other by hinges 210A, 210B, 210C, 210D, 210E, 210F. Each hinge 210A, 210B, 210C, 210D, 210E, 210F can be attached to edges and/or edge portions of two panels 208A, 208B, 208C, 208D, 208E, 208F, rotatably attaching the panels 208A, 208B, 208C, 208D, 208E, 208F to each other. The hinges can include traditional, mechanical hinges, magnets, or pins engaging apertures, as non-limiting examples. While this example includes six panels 208A, 208B, 208C, 208D, 208E, 208F forming a hexagon, the stylus 200 may include any number of panels forming any type of polygon. A diameter 211 of the stylus 200 in a shortest direction may be, for example, less than one inch.

Figure 2E:
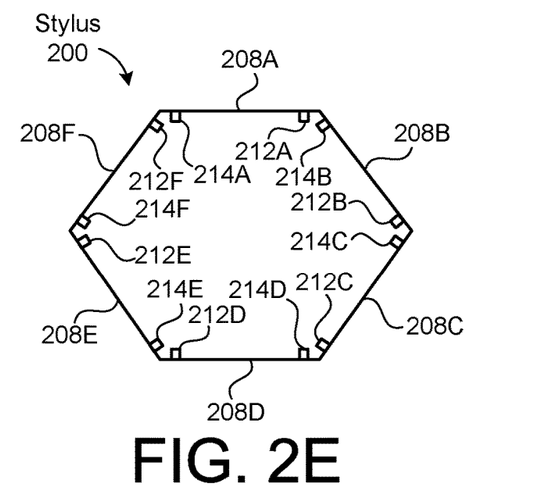
FIG. 2E is an end view of the stylus with multiple panels according to an example implementation in which the panels are attached to each other by magnets.

FIG. 2E is an end view of the stylus 200 with multiple panels 208A, 208B, 208C, 208D, 208E, 208F according to an example implementation in which the panels 208A, 208B, 208C, 208D, 208E, 208F are attached to each other by magnets 212A, 212B, 212C, 212D, 212E, 212F, 214A, 214B, 214C, 214D, 214E, 214F. In this example, each panel 208A, 208B, 208C, 208D, 208E, 208F can include a pair of magnets 212A, 212B, 212C, 212D, 212E, 212F, 214A, 214B, 214C, 214D, 214E, 214F at opposite edges. The pairs of magnets 212A, 212B, 212C, 212D, 212E, 212F, 214A, 214B, 214C, 214D, 214E, 214F that rotatably attach two panels 208A, 208B, 208C, 208D, 208E, 208F can have opposite polarities, magnetically coupling the magnets 212A, 212B, 212C, 212D, 212E, 212F, 214A, 214B, 214C, 214D, 214E, 214F to each other to create the rotatable attachment. For example, the magnet 212A on the panel 208A can have an opposite polarity as the magnet 214B on the panel 208B, causing the magnets 212A, 214B to attract each other and creating the rotatable attachment.

Figure 2F:
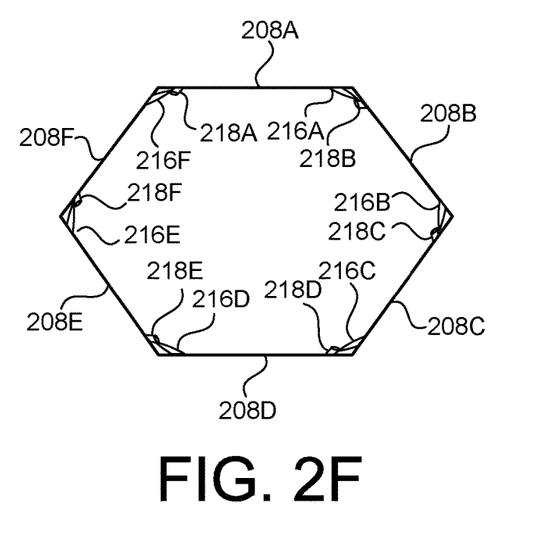
FIG. 2F is an end view of the stylus with multiple panels according to an example implementation in which the panels are attached to each other by pins.

FIG. 2F is an end view of the stylus 200 with multiple panels 208A, 208B, 208C, 208D, 208E, 208F according to an example implementation in which the panels 208A, 208B, 208C, 208D, 208E, 208F are attached to each other by pins 216A, 216B, 216C, 216D, 216E, 216F. The pins 216A, 216B, 216C, 216D, 216E, 216F can each be attached to a panel 208A, 208B, 208C, 208D, 208E, 208F, and can engage an aperture 218A, 218B, 218C, 218D, 218E, 218F on the adjacent panel 208A, 208B, 208C, 208D, 208E, 208F. For example, the pin 216A on the panel 208A can engage the aperture 218B on the panel 208B, rotatably attaching the panels 208A, 208B to each other.

Figure 3A:
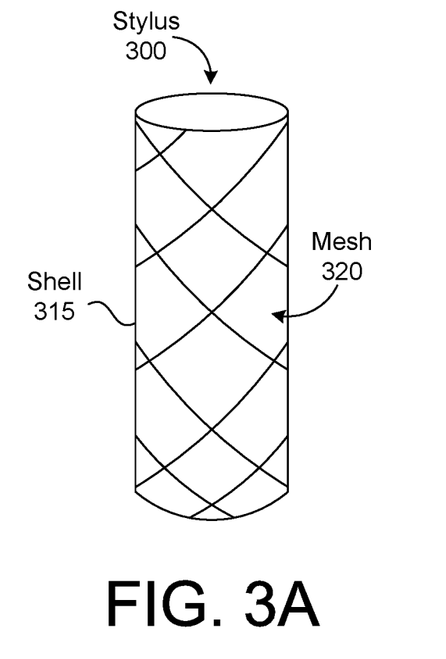
FIG. 3A is a diagram of a stylus in an open position in an example in which the stylus is configured to transition between the open position and a collapsed position in response to twisting pressure.

FIG. 3A is a diagram of a stylus 300 in an open position in an example in which the stylus 300 is configured to transition between the open position and a collapsed position in response to twisting pressure. The stylus 300 can include features and/or functionalities of either of the styluses 100, 200 described above.

In this example, the shell 315 can include a polymer material and/or silicon material with a crystalline plane forming a mesh 320. The crystalline plane and/or mesh 320, or woven or mesh-like material, can give the shell 315 structural integrity in only a single direction, causing the shell 315 to be biased to either of two positions, the open position shown in FIG. 3A, in which the shell 315 forms a cylinder than maximizes a volume enclosed by the shell 315, or the collapsed position shown in FIG. 3B, in which the shell 315 collapses, shrinks, and/or folds into a flat or collapsed position shown in FIG. 3B, in which opposite portions of the shell 315 are in contact with each other and the volume enclosed by the shell is minimized.

Figure 3B:
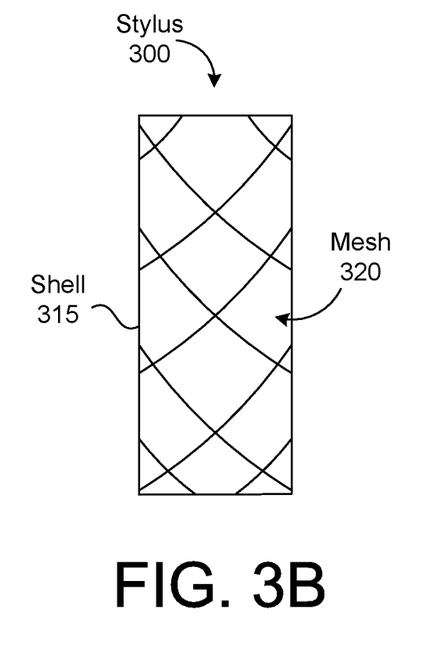
FIG. 3B is a diagram of the stylus in the collapsed position in the example in which the stylus is configured to transition between the open position and the collapsed position in response to twisting pressure.

FIG. 3B is a diagram of the stylus 300 in the collapsed position in the example in which the stylus 300 is configured to transition between the open position and the collapsed position in response to twisting pressure. In this example, the stylus 300 has been twisted or pressed into the collapsed position, so that the shell 315 of the stylus 300 is flat and the stylus can fit into the slot 154 of the portable computing device 150.

Figure 3C:
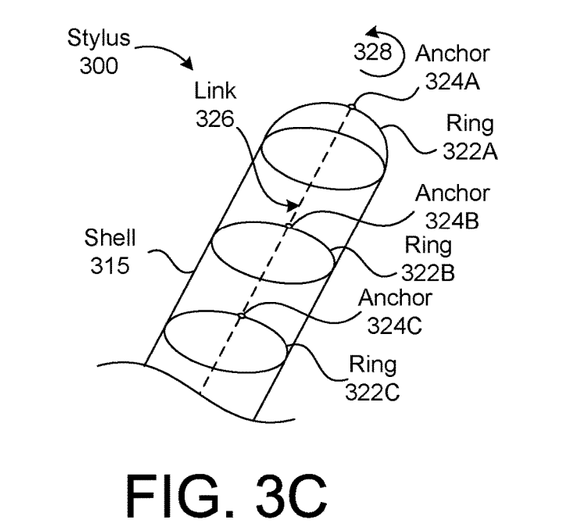
FIG. 3C is a transparent perspective view of the stylus in the open position in the example in which the stylus is configured to transition between the open position and the collapsed position in response to twisting pressure.

FIG. 3C is a transparent perspective view of the stylus 300 in the open position in the example in which the stylus 300 is configured to transition between the open position and the collapsed position in response to twisting pressure. In some examples, the stylus 300 shown in FIGS. 3C, 3D, and 3E can be made of a different material than the stylus 300 shown in FIGS. 3A and 3B. The crystalline structure and/or mesh 320 of the shell 315 can form rings 322A, 322B, 322C. The rings 322A, 322B, 322C can be mechanically coupled to each other via a link 326 that is connected to the rings 322A, 322B, 322C by anchors 324A, 324B, 324C included in each ring 322A, 322B, 322C. The link 326 can cause the rings 322A, 322B, 322C to rotate in tandem with each other as the stylus 300 transitions between the open position and the collapsed position. The rings 322A, 322B, 322C can, for example, transition to the collapsed position in response to twisting pressure in direction 328, and transition to the open position in response to twisting pressure in a direction opposite from direction 328. The link 326 can maintain the positions of the anchors 324A, 324B, 324C with respect to each other, which allows the rings 322A, 322B, 322C to rotate into a collapsed position shown in FIG. 3D.

Figure 3D:
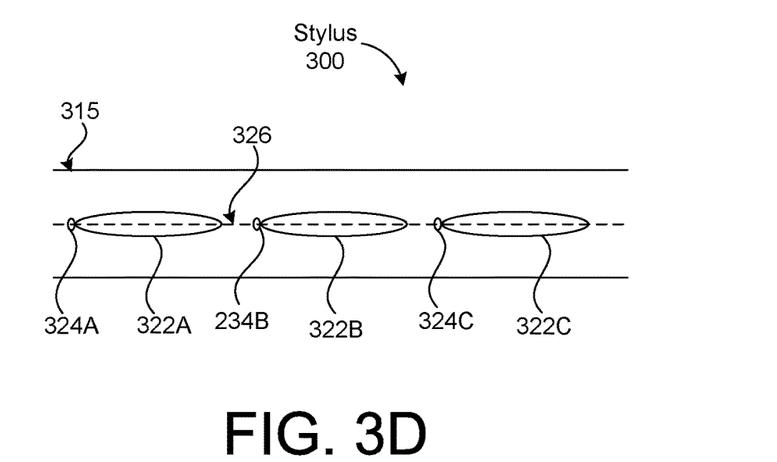
FIG. 3D is a transparent side view of the stylus in the collapsed position in the example in which the stylus is configured to transition between the open position and the collapsed position in response to twisting pressure.

FIG. 3D is a transparent side view of the stylus 300 in the collapsed position in the example in which the stylus 300 is configured to transition between the open position and the collapsed position in response to twisting pressure. As shown in FIG. 3D, when the stylus 300 is in the closed position, the rings 322A, 322B, 322B have rotated and extend in a direction parallel to the extension of the stylus 300 between opposite ends, and/or perpendicular to a direction between opposite portions of the shell 315.

Figure 3E:
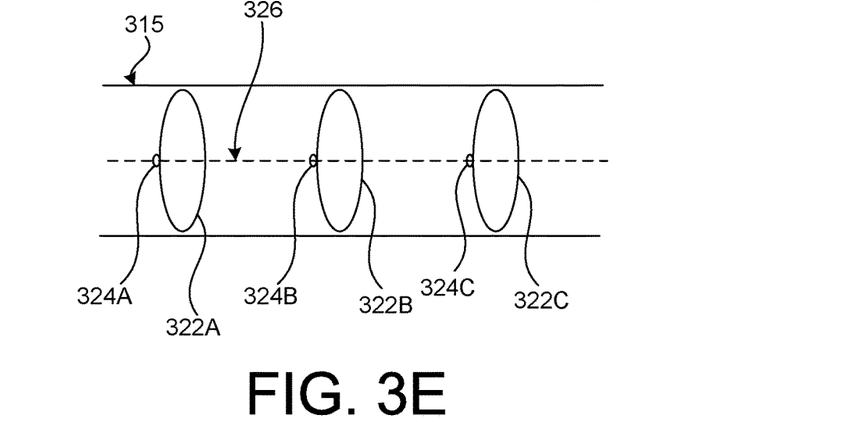
FIG. 3E is a transparent side view of the stylus in the open position in the example in which the stylus is configured to transition between the open position and the collapsed position in response to twisting pressure.

FIG. 3E is a transparent side view of the stylus 300 in the open position in the example in which the stylus 300 is configured to transition between the open position and the collapsed position in response to twisting pressure. As shown in FIG. 3E, when the stylus 300 is in the open position, the rings 322A, 322B, 322B extend in a direction perpendicular to the extension of the stylus 300 between opposite ends, and/or parallel to a direction between opposite portions of the shell 315, and can provide internal support for the cylindrical shape of the stylus 300.

Figure 4:
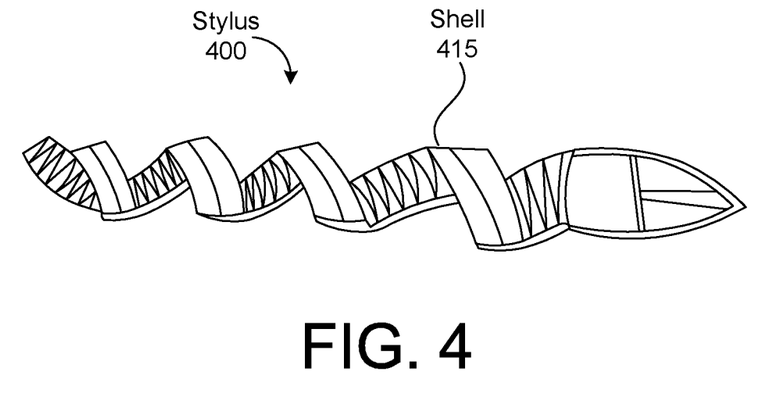
FIG. 4 is a diagram of a stylus with a spiral-shaped shell according to an example implementation.

FIG. 4 is a diagram of a stylus 400 with a spiral-shaped shell 415 according to an example implementation. The stylus 400 can include features and/or functionalities of any of the styluses 100, 200, 300 described above. The shell 415 may be formed of a single panel, with features of any of the panels 208A, 208B, 208C, 208D, 208E, 208F, shaped to roll into a spiral. Adjacent edges of the shell 315 can attach to each other by any mechanism described above with respect to the panels 208A, 208B, 208C, 208D, 208E, 208F. The shell 415 can be secured in the spiral form in the open position of the stylus 400, and can be unrolled and/or unraveled into a flat or collapsed position for storage in the slot 154 of the portable computing device 150.

Figure 5A:
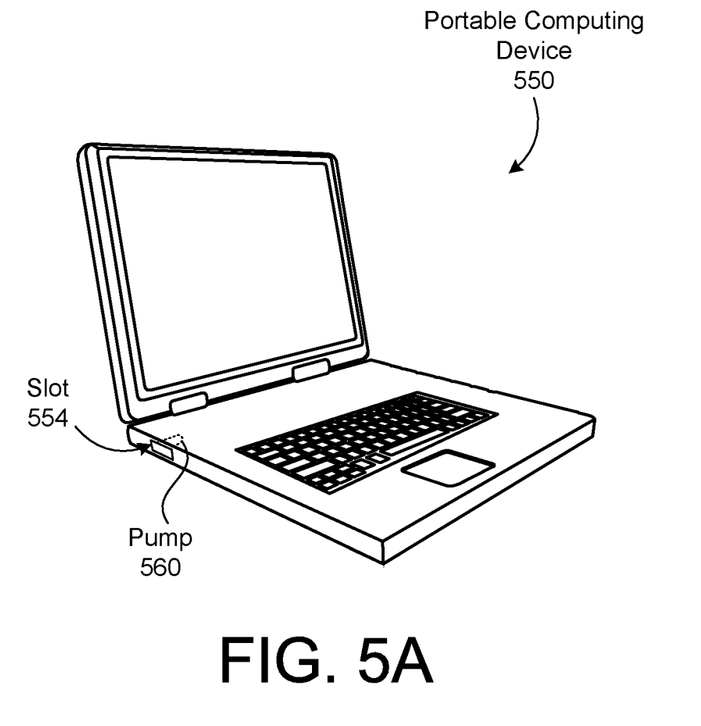
FIG. 5A is a diagram of a portable computing device with a pump for expanding a stylus according to an example implementation.

FIG. 5A is a diagram of a portable computing device 550 with a pump 560 for expanding a stylus 500 according to an example implementation. The stylus 500 (shown in FIGS. 5B and 5C) can include features and/or functionalities of any of the styluses 100, 200, 300, 400 described above, and the portable computing device 550 can include features and/or functionalities of the portable computing device 150 described above. In this example, the portable computing device 550 can include the pump 560 extending into a slot 554. The slot 554 can include any features and/or functionalities of the slot 154 described above. The pump 560 can pump air into the stylus 500 via a valve 522 (shown in FIG. 5B) to transition the stylus 500 into the open position, and can pump air out of the stylus 500 via the valve 522 to transition the stylus 500 into the collapsed position.

Figure 5B:
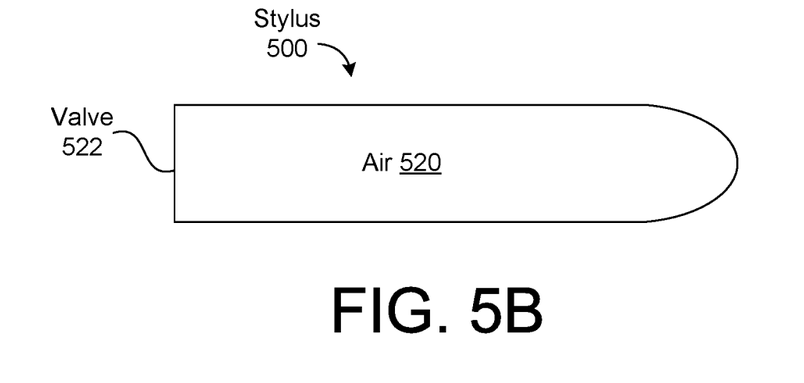
FIG. 5B is a diagram of the stylus in an open position that was pumped into the open position by the pump in FIG. 5A according to an example implementation.

FIG. 5B is a diagram of the stylus 500 in an open position that was pumped into the open position by the pump 560 in FIG. 5A according to an example implementation. The stylus 500 can be sealed to prevent air 520 from exiting the stylus 500 except via a valve 522 included in the stylus 500. The valve 522 can remain closed until the pump 560 penetrates the valve to pump air 520 into or out of the stylus 500.

Figure 5C:
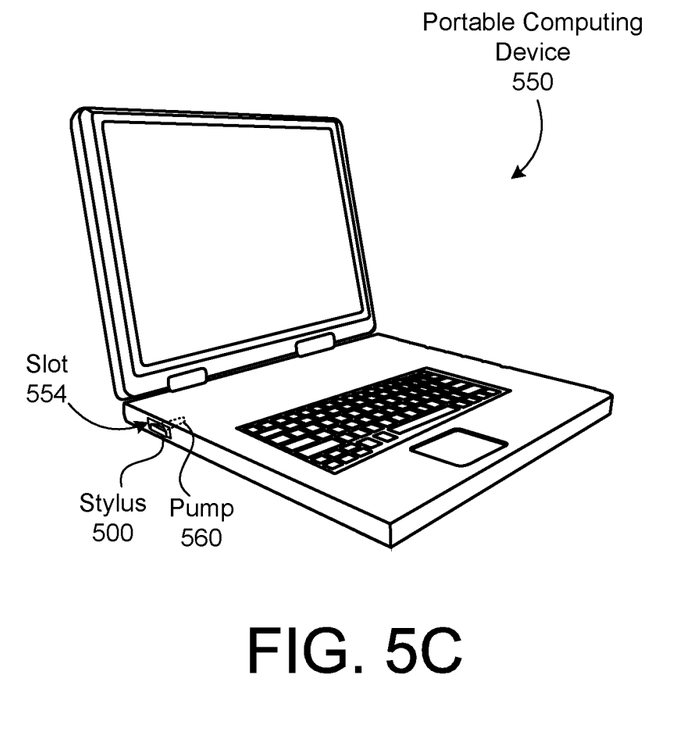
FIG. 5C is a diagram with the stylus of FIG. 5B in a collapsed position and garaged in the portable computing device of FIG. 5A according to an example implementation.

FIG. 5C is a diagram with the stylus 500 of FIG. 5B in a collapsed position and garaged in the portable computing device 550 of FIG. 5A according to an example implementation. The stylus 500 can be inserted into the slot 554 of the portable computing device 550, and the pump 560 can pump air into the stylus 500 to expand the stylus 500 into the open position, and/or pump air out of the stylus 500 to contract the stylus 500 into the collapsed position.

Figure 6:
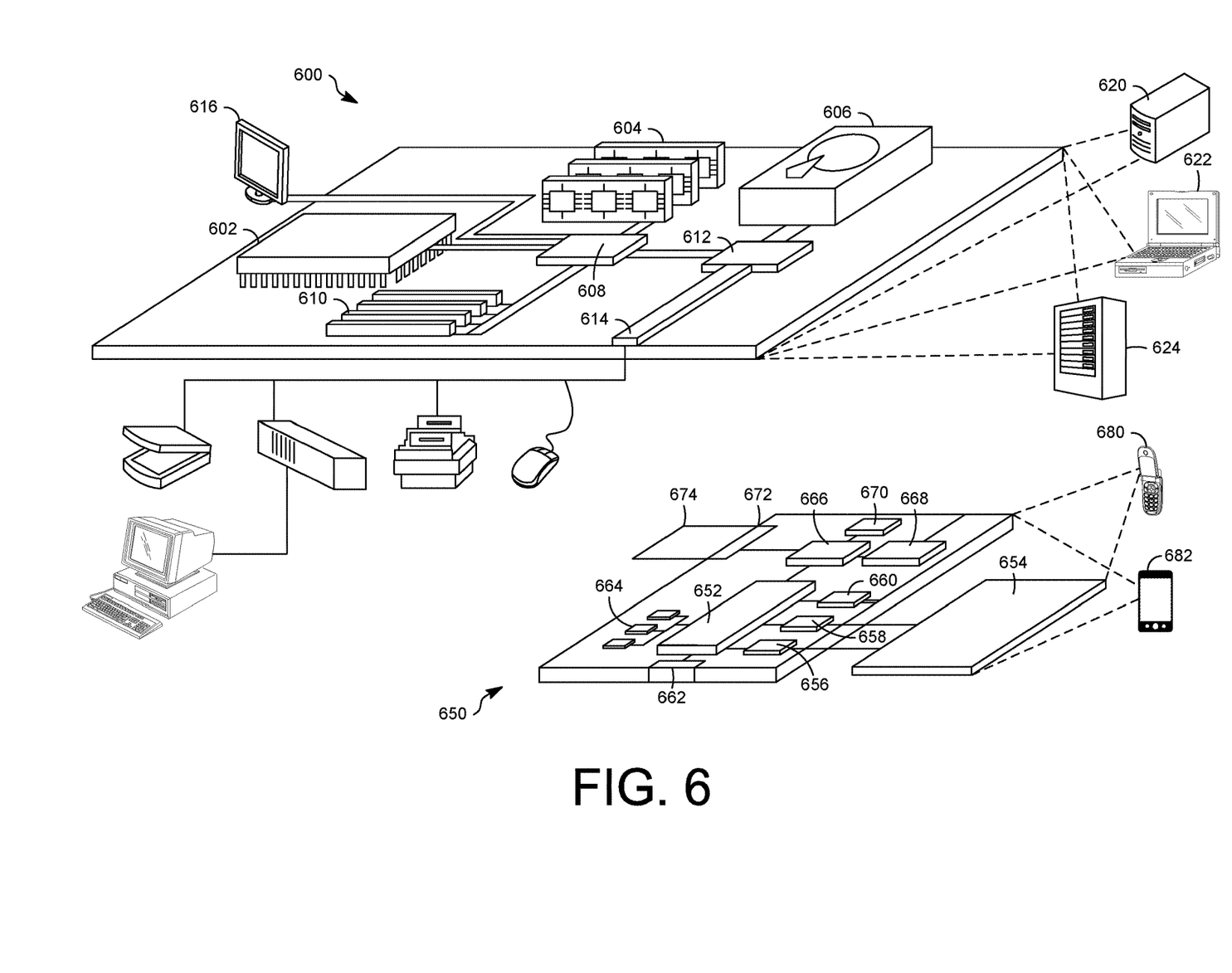
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

According to a first example, a collapsible electronic stylus can comprise multiple panels rotatably attached to each other, the rotatable attachment of the multiple panels forming a loop and enabling the multiple panels to rotate with respect to each other between an open position that maximizes a volume enclosed by the panels and a collapsed position that minimizes the volume enclosed by the panels; a processor attached to at least one of the panels, the processor being configured to control a transmitter; and the transmitter configured to transmit signals to a computing device.

According to a second example, in the collapsible electronic stylus of the first example, the multiple panels can maintain the loop in the collapsed position.

According to a third example, in the collapsible electronic stylus of either the first or second examples, the rotatable attachment between at least two of the multiple panels can disengage in the collapsed position, breaking the loop.

According to a fourth example, in the collapsible electronic stylus of any of the first, second, or third examples, the multiple panels can comprise an even number of panels.

According to a fifth example, the collapsible electronic stylus of any of the first through fourth examples can further comprise multiple magnets rotatably attaching the multiple panels to each other, the multiple magnets being disposed on edge portions of the multiple panels.

According to a sixth example, the collapsible electronic stylus of any of the first through fifth examples can further comprise multiple pins configured to hold the multiple panels in the open position.

According to a seventh example, in the collapsible electronic stylus of any of the first through sixth examples, the multiple panels can comprise six panels forming a hexagon in the open position.

According to a eighth example, in the collapsible electronic stylus of any of the first through seventh examples, the multiple panels can comprise plastic.

According to a ninth example, in the collapsible electronic stylus of any of the first through eighth examples, the multiple panels can comprise carbon fiber.

According to a tenth example, in the collapsible electronic stylus of any of the first through ninth examples, the multiple panels can aluminum.

According to an eleventh example, in the collapsible electronic stylus of any of the first through tenth examples, the multiple panels can comprise rubber.

According to a twelfth example, in the collapsible electronic stylus of any of the first through eleventh examples, a diameter of the collapsible electronic stylus in a shortest direction, when the collapsible electronic stylus is in the open position, can be less than one inch.

According to a thirteenth example, in the collapsible electronic stylus of any of the first through twelfth examples, the multiple panels can comprise multiple side panels that are rotatably attached to each other to form the loop, and an end panel rotatably attached to one of the side panels, the end panel being configured to rotate into a position in contact with all of the multiple side panels when the collapsible electronic stylus is in the open position.

According to a fourteenth example, in the collapsible electronic stylus of any of the first through thirteenth examples, the multiple panels can each comprise a rectangular portion rotatably attached to the rectangular portions of two other panels of the collapsible electronic stylus, and a triangular portion that, when the collapsible electronic stylus is in the open position, is in contact with the triangular portions of two other panels of the collapsible electronic stylus.

According to a fifteenth example, in the collapsible electronic stylus of the fourteenth example, the triangular portions of the multiple panels can comprise faces of an imaginary pyramid.

According to a sixteenth example, in the collapsible electronic stylus of either the fourteenth or fifteenth examples, the transmitter is attached to one of the triangular portions.

According to a seventeenth example, a collapsible electronic stylus can comprise a shell portion, a processor, and a transmitter. The shell portion can be configured to respond to pressure by transitioning from a first position in which the shell is biased toward a cylindrical shape to a second position in which the shell is biased toward a flat shape with opposite sides of the shell portion in contact with each other. The processor can be attached to at least one of the panels, and can be configured to control the transmitter. The transmitter can be configured to transmit signals to a computing device.

According to an eighteenth example, the collapsible electronic stylus of the seventeenth example can further comprise an end portion attached to the shell portion, and the transmitter can be attached to the end portion.

According to a nineteenth example, in the collapsible electronic stylus of either the seventeenth or eighteenth example, the shell portion can be configured to respond to twisting pressure by transitioning from the first position to the second position.

According to a twentieth example, a portable computing device can include a display and a base rotatably attached to the display. The base can define a slot. The base can comprise at least one device processor controlling the display, a receiver configured to receive wireless signals and transmit the received wireless signals to the at least one device processor, and an electronic stylus disposed in the slot in a collapsed position. The electronic stylus can comprise multiple panels, a stylus processor, and a transmitter. The multiple panels can be rotatably attached to each other. The rotatable attachment of the multiple panels can form a loop and enable the multiple panels to rotate with respect to each other between an open position that maximizes a volume enclosed by the panels and the collapsed position that minimizes the volume enclosed by the panels. The stylus processor can be attached to at least one of the panels. The stylus processor can be configured to control a transmitter. The transmitter can be configured to transmit the wireless signals to the portable computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A collapsible electronic stylus comprising:
   multiple panels rotatably attached to each other, the rotatable attachment of the multiple panels forming a loop and enabling the multiple panels to rotate with respect to each other between an open position that maximizes a volume enclosed by the panels and a collapsed position that minimizes the volume enclosed by the panels, each of the multiple panels comprising:
      a rectangular portion rotatably attached to the rectangular portions of two other panels of the collapsible electronic stylus; and
      a triangular portion that, when the collapsible electronic stylus is in the open position, is in contact with the triangular portions of two other panels of the collapsible electronic stylus;
   a processor attached to at least one of the panels, the processor being configured to control a transmitter; and
   the transmitter configured to transmit signals to a computing device.

2. The collapsible electronic stylus of claim 1, wherein the multiple panels maintain the loop in the collapsed position.

3. The collapsible electronic stylus of claim 1, wherein the rotatable attachment between at least two of the multiple panels disengages in the collapsed position, breaking the loop.

4. The collapsible electronic stylus of claim 1, wherein the multiple panels comprises an even number of panels.

5. The collapsible electronic stylus of claim 1, further comprising multiple magnets rotatably attaching the multiple panels to each other, the multiple magnets being disposed on edge portions of the multiple panels.

6. The collapsible electronic stylus of claim 1, further comprising multiple pins configured to hold the multiple panels in the open position.

7. The collapsible electronic stylus of claim 1, wherein the multiple panels comprise six panels forming a hexagon in the open position.

8. The collapsible electronic stylus of claim 1, wherein the multiple panels comprise plastic.

9. The collapsible electronic stylus of claim 1, wherein the multiple panels comprise carbon fiber.

10. The collapsible electronic stylus of claim 1, wherein the multiple panels comprise aluminum.

11. The collapsible electronic stylus of claim 1, wherein the multiple panels comprise rubber.

12. The collapsible electronic stylus of claim 1, wherein a diameter of the collapsible electronic stylus in a shortest direction, when the collapsible electronic stylus is in the open position, is less than one inch.

13. The collapsible electronic stylus of claim 1, wherein the triangular portions of the multiple panels form a pyramid with a base missing.

14. The collapsible electronic stylus of claim 1, wherein the transmitter is attached to one of the triangular portions.

15. A collapsible electronic stylus comprising:
   a shell portion, the shell portion comprising a crystalline plane forming a mesh and being configured to respond to pressure by transitioning from a first position in which the shell is biased toward a cylindrical shape to a second position in which the shell is biased toward a flat shape with opposite sides of the shell portion in contact with each other;
   a processor attached to the shell portion, the processor being configured to control a transmitter; and
   the transmitter configured to transmit signals to a computing device.

16. The collapsible electronic stylus of claim 15, further comprising:
   an end portion attached to the shell portion,
   wherein the transmitter is attached to the end portion.

17. The collapsible electronic stylus of claim 15, wherein the shell portion is configured to respond to twisting pressure by transitioning from the first position to the second position.

18. The collapsible electronic stylus of claim 15, wherein the mesh forms rings mechanically coupled to each other via at least one link, the at least one link being configured to cause the rings to rotate in tandem with each other as the collapsible electronic stylus transitions between the first position and the second position.

19. A collapsible electronic stylus comprising:
multiple side panels rotatably attached to each other to form a loop, the rotatable attachment of the multiple panels enabling the multiple panels to rotate with respect to each other between an open position that maximizes a volume enclosed by the panels and a collapsed position that minimizes the volume enclosed by the panels;
an end panel rotatably attached to one of the side panels, the end panel being configured to rotate into a position in contact with all of the multiple side panels when the collapsible electronic stylus is in the open position;
a processor attached to at least one of the panels, the processor being configured to control a transmitter; and
the transmitter configured to transmit signals to a computing device.

* * * * *